(12) United States Patent
Fujita et al.

(10) Patent No.: US 8,397,750 B2
(45) Date of Patent: Mar. 19, 2013

(54) OIL SUCTION DEVICE FOR AUTOMATIC TRANSMISSION

(75) Inventors: Hirofumi Fujita, Okazaki (JP);
Kazuyuki Watanabe, Anjyo (JP);
Kazuaki Nakamura, Toyota (JP);
Takeshi Ishiwada, Anjyo (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 1306 days.

(21) Appl. No.: 11/934,884

(22) Filed: Nov. 5, 2007

(65) Prior Publication Data
US 2008/0115847 A1    May 22, 2008

(30) Foreign Application Priority Data
Nov. 16, 2006    (JP) ................ 2006-310346

(51) Int. Cl.
*B60P 3/24*    (2006.01)
*F17C 3/00*    (2006.01)
*F01M 5/00*    (2006.01)

(52) U.S. Cl. ........ 137/574; 137/573; 137/590; 220/563; 123/196 AB

(58) Field of Classification Search ............... 137/573, 137/574, 576, 590; 220/563, 564; 123/196 AB, 123/198, 198 E
See application file for complete search history.

(56) References Cited

U.S. PATENT DOCUMENTS

| | | | | |
|---|---|---|---|---|
| 4,134,380 A | * | 1/1979 | Niwa et al. | 123/142.5 R |
| 4,561,977 A | * | 12/1985 | Sasaki | 210/356 |
| 5,301,642 A | * | 4/1994 | Matsushiro et al. | 123/196 AB |
| 5,937,817 A | * | 8/1999 | Schanz et al. | 123/196 AB |
| 6,116,454 A | * | 9/2000 | Henderson et al. | 220/563 |
| 6,523,561 B2 | * | 2/2003 | Kapcoe et al. | 137/15.01 |
| 6,929,742 B2 | * | 8/2005 | Wehrum et al. | 210/257.1 |
| 7,343,901 B2 | * | 3/2008 | Mori et al. | 123/446 |

FOREIGN PATENT DOCUMENTS

| | | |
|---|---|---|
| JP | 62-288774 | 12/1987 |
| JP | 1-66205 U | 11/1989 |
| JP | 2-128862 | 10/1990 |
| JP | 5-280619 | 10/1993 |
| JP | 6-307523 A | 11/1994 |
| JP | 7-41850 U | 9/1995 |
| JP | 11-22811 A | 1/1999 |
| JP | 11-257468 A | 9/1999 |
| JP | 2000-46155 A | 2/2000 |
| JP | 2007-205499 | 8/2007 |

* cited by examiner

*Primary Examiner* — Craig Schneider
*Assistant Examiner* — Atif Chaudry
(74) *Attorney, Agent, or Firm* — Sughrue Mion, PLLC

(57) ABSTRACT

An oil suction device for an automatic transmission includes: an oil pan that receives oil supplied to various portions of the automatic transmission and returned to the oil pan and reserves the received oil therein; an oil strainer located over the oil pan; a suction port drawing in the oil reserved in the oil pan; and an elastic wall provided selectively between a portion of the oil pan that receives a relatively small amount of the oil returned to the oil pan and the suction port, the elastic wall extending from a bottom surface of the oil pan and reaching a lower surface of the oil strainer to interrupt a flow of oil.

2 Claims, 5 Drawing Sheets

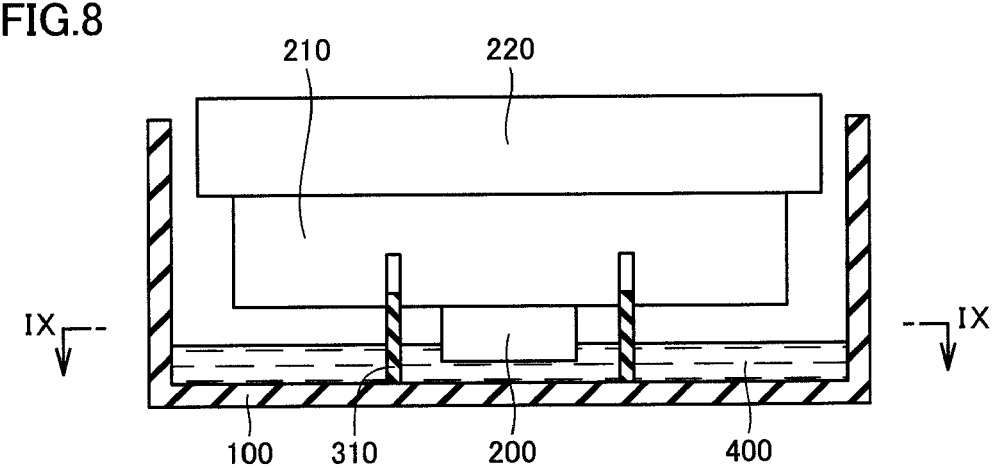
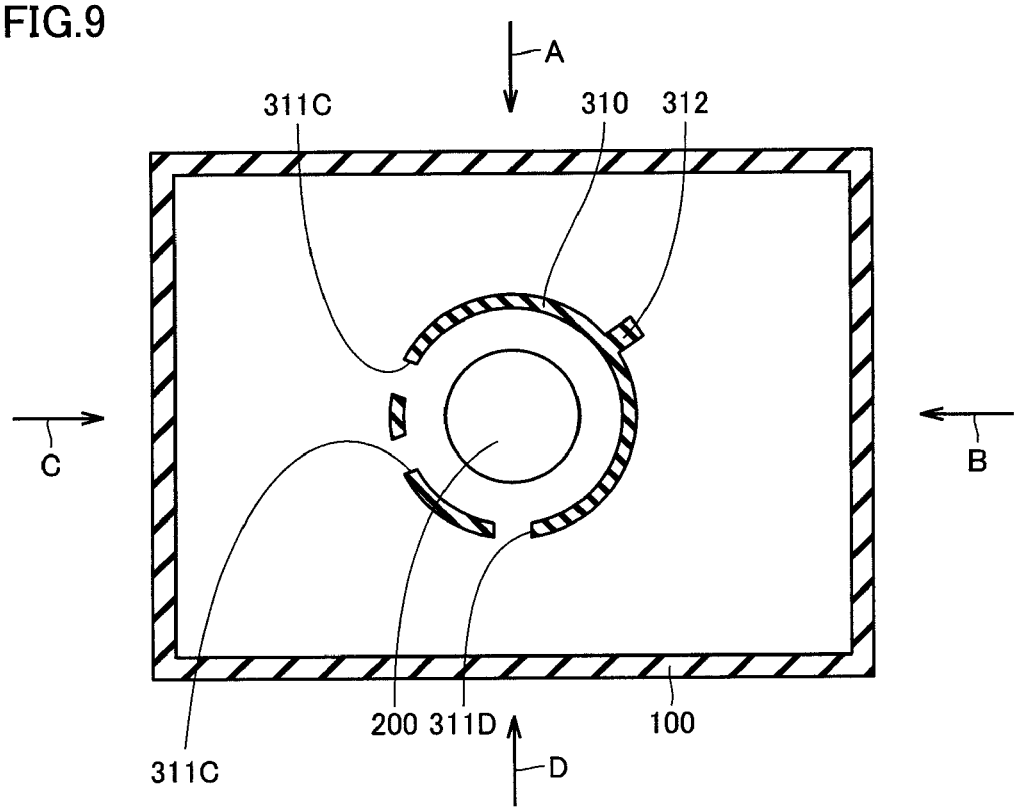

OIL SUCTION DEVICE FOR AUTOMATIC TRANSMISSION

This nonprovisional application is based on Japanese Patent Application No. 2006-310346 filed with the Japan Patent Office on Nov. 16, 2006, the entire contents of which are hereby incorporated by reference.

BACKGROUND OF THE INVENTION

1. Field of the Invention

The present invention relates generally to oil suction devices for automatic transmissions and particularly to oil suction devices for automatic transmissions that draw in oil reserved in an oil pan.

2. Description of the Background Art

Transmissions mounted on vehicles have conventionally been known.

For example Japanese Patent Laying-open No. 2000-46155 describes that a vehicular transmission including a housing having a first chamber accommodating a continuously variable transmission and a second chamber accommodating a driving-force transmission device including a starting device has an oil path in each chamber for returning lubricant oil to an oil pan.

Furthermore, Japanese Patent Laying-open No. 11-257468 describes a flat plate movable upward and downward in response to the level of the surface of oil with an oil strainer of an automatic transmission enclosed.

Furthermore, Japanese Patent Laying-open No. 11-22811 describes that an oil strainer of an automatic transmission has a suction port configured to be movable relative to the bottom of an oil pan.

When an oil pan has oil having a low liquid level reserved therein, drawing the oil into a suction port can also draws air into the suction port. For the transmission described in Japanese Patent Laying-open No. 2000-46155, the oil used for example to lubricate various devices flows from the devices downward and returns to the oil pan. However, the oil pan receives different amounts of oil at different portions for a structural ground. As such, a portion of the oil pan that receives a relatively small amount of the oil returned to the oil pan would allow air to be more readily drawn in. Such disadvantage is particularly significant at low temperatures allowing oil to increase in viscosity so that the oil pan receives reduced amounts of the oil returned thereto.

Japanese Patent Laying-open Nos. 11-257468 and 11-22811 describe that they contemplate preventing air from being drawn in as described above. However, the documents do not describe selectively preventing air from being drawn in at a portion of an oil pan that receives a small amount of the oil returned to the oil pan.

SUMMARY OF THE INVENTION

The present invention has been made to overcome such disadvantage and it contemplates an oil suction device for an automatic transmission that can reduce air drawn in from a portion of an oil pan that receives a small amount of the oil returned to the oil pan.

The present invention in one aspect provides an oil suction device for an automatic transmission that includes: an oil pan having a bottom surface, and receiving and reserving therein oil supplied to various portions of the automatic transmission and returned to the oil pan; an upper member having a lower surface over the oil pan; a suction port drawing in the oil reserved in the oil pan; and a barrier provided selectively between a portion of the oil pan that receives a relatively small amount of the oil returned to the oil pan and the suction port, the barrier extending from the bottom surface of the oil pan and reaching the lower surface of the upper member to interrupt a flow of the oil.

The barrier that is provided selectively between a portion receiving a small amount of the oil returned to the oil pan and the suction port can effectively reduce air drawn in from such portion.

Note that the barrier may pass a flow of oil when the oil pan has therein oil having an increased liquid level.

Preferably in the oil suction device for the automatic transmission the barrier is deformable in accordance with a gap formed between the bottom surface of the oil pan and the lower surface of the upper member.

The barrier that is deformable can absorb a dimensional error of a gap formed between the oil pan and the upper member, and as a result more effectively reduce air drawn in from the portion of an oil pan that receives a small amount of the oil returned to the oil pan.

Preferably in the oil suction device for the automatic transmission the barrier includes an elastic member. The barrier can thus readily deform in accordance with a gap formed between the bottom surface of the oil pan and the lower surface of the upper member.

The present invention in another aspect provides an oil suction device for an automatic transmission that includes: an oil pan having a bottom surface, and receiving and reserving therein oil supplied to various portions of the automatic transmission and returned to the oil pan; a suction port drawing in the oil reserved in the oil pan; and a wall member surrounding the suction port and having an opening between a portion of the oil pan that receives a relatively large amount of the oil returned to the oil pan and the suction port, the wall member being movable upward and downward relative to the suction port in response to a liquid level of the oil reserved in the oil pan. When the wall member moves to its lowest position the wall member has its lower end in contact with the bottom surface of the oil pan. When the wall member moves to a position upper than the lowest position the wall member has its lower end detached from the bottom surface of the oil pan.

Thus when the oil has a low liquid level, the oil flowing toward the suction port from a portion of the oil pan that receives a relatively small amount of the oil returned to the oil pan is selectively interrupted by the wall member, and when the oil has a high liquid level, the oil flowing toward the suction port in any directions is accepted. Thus, when the oil has a low liquid level, air drawn in from a portion of the oil pan that receives a small amount of the oil returned to the oil pan can be effectively reduced, and when the oil has a high liquid level, the suction port can draw in the oil efficiently.

Preferably the oil suction device for the automatic transmission further includes an upper member having a lower surface over the oil pan, wherein the wall member at least reaches the lower surface of the upper member.

The wall member that reaches the lower surface of the upper member further ensures that air drawn in is reduced.

Preferably in the oil suction device for the automatic transmission the wall member includes a material smaller in specific gravity than the oil and is configured to float up in response to the liquid level of the oil reserved in the oil pan.

This allows the wall member to interrupt a flow of oil, as switched automatically in response to the liquid level of the oil.

Preferably in the oil suction device for the automatic transmission the portion of the oil pan that receives the relatively large amount of the oil returned to the oil pan includes a first portion and a second portion receiving a larger amount of the oil returned to the oil pan than the first portion does. The opening includes a first opening located between the first portion and the suction port and a second opening located between the second portion and the suction port. The second opening is larger than the first opening.

This allows the oil to be efficiently drawn in and can also reduce air drawn in from a portion that receives a large amount of the oil returned to the oil pan.

As one example in the oil suction device for the automatic transmission the wall member is cylindrical. In that case the wall member has an outer circumferential surface with a projection extending therefrom radially outward.

The wall member having an outer peripheral surface with a projection extending therefrom radially outward can be prevented from rotating.

As one example in the oil suction device for the automatic transmission the upper member includes an oil strainer and the oil drawn in through the suction port is guided to the oil strainer.

Note that the automatic transmission includes both a power transmission device for a hybrid vehicle having a transmission and a drive shaft integrated together, and a device having only a transmission.

The present invention can thus provide an oil suction device for an automatic transmission that can reduce air drawn in from a suction port drawing in oil.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 shows an exemplary variation of the oil suction device for the automatic transmission according to one embodiment of the present invention with oil having a low liquid level.

FIG. 9 is a cross section IX-IX of FIG. 8.

DESCRIPTION OF THE PREFERRED EMBODIMENTS

Hereinafter the present invention will be described in embodiments. Identical or like components are identically denoted and will not be described repeatedly.

In the below described embodiments a number, an amount and the like may be referred to. However, the present invention is not necessarily limited in scope to such number, amount or the like, unless otherwise indicated. Furthermore in the below described embodiments various components are described. However they are not necessarily essential to the present invention, unless otherwise indicated. Furthermore if in the following a plurality of embodiments are described, they may have their characteristic portions combined together, as appropriate.

Figure 1:
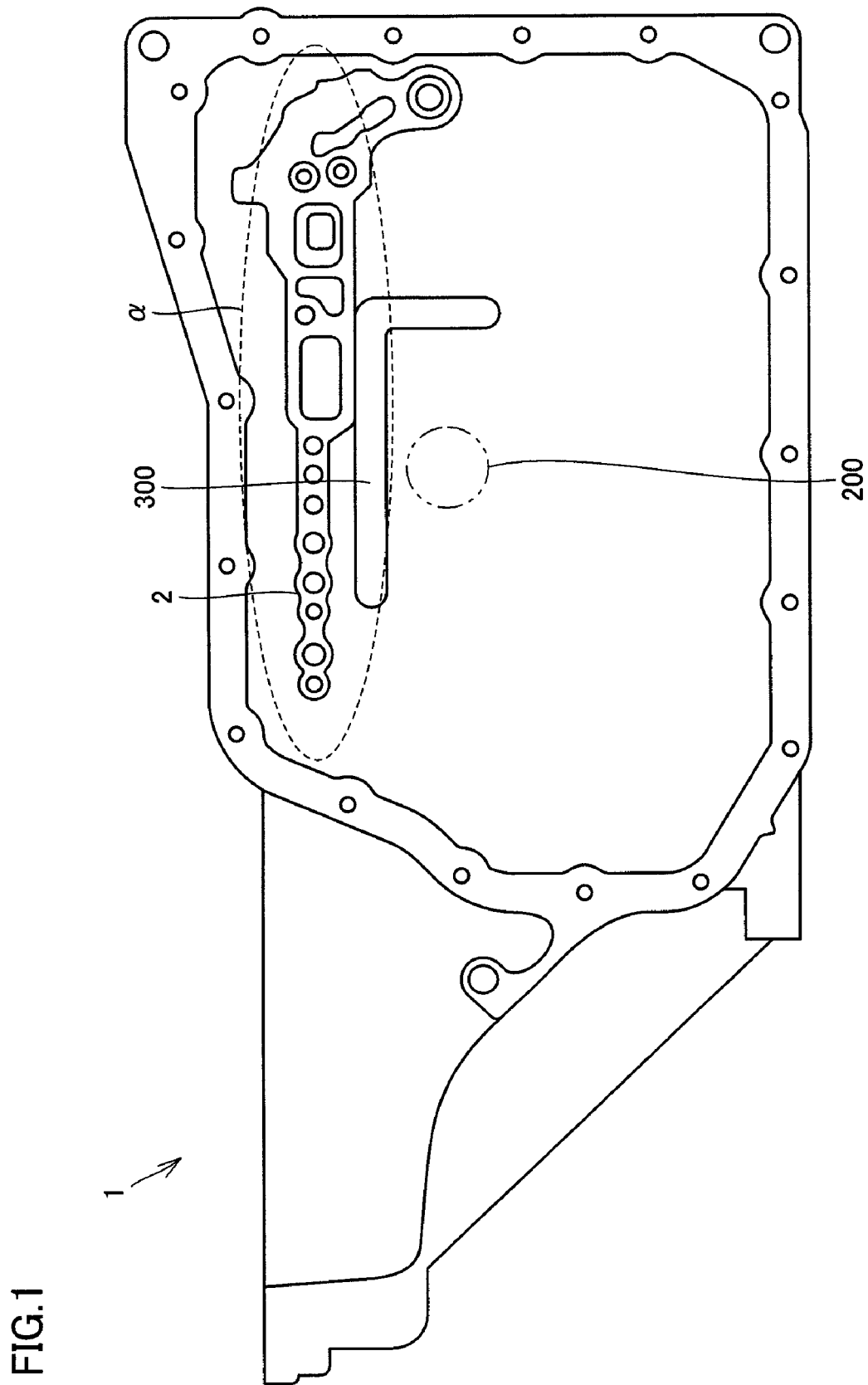
FIG. 1 is a bottom view of a case of an automatic transmission provided with an oil suction device for the automatic transmission according to one embodiment of the present invention.
Figure 2:
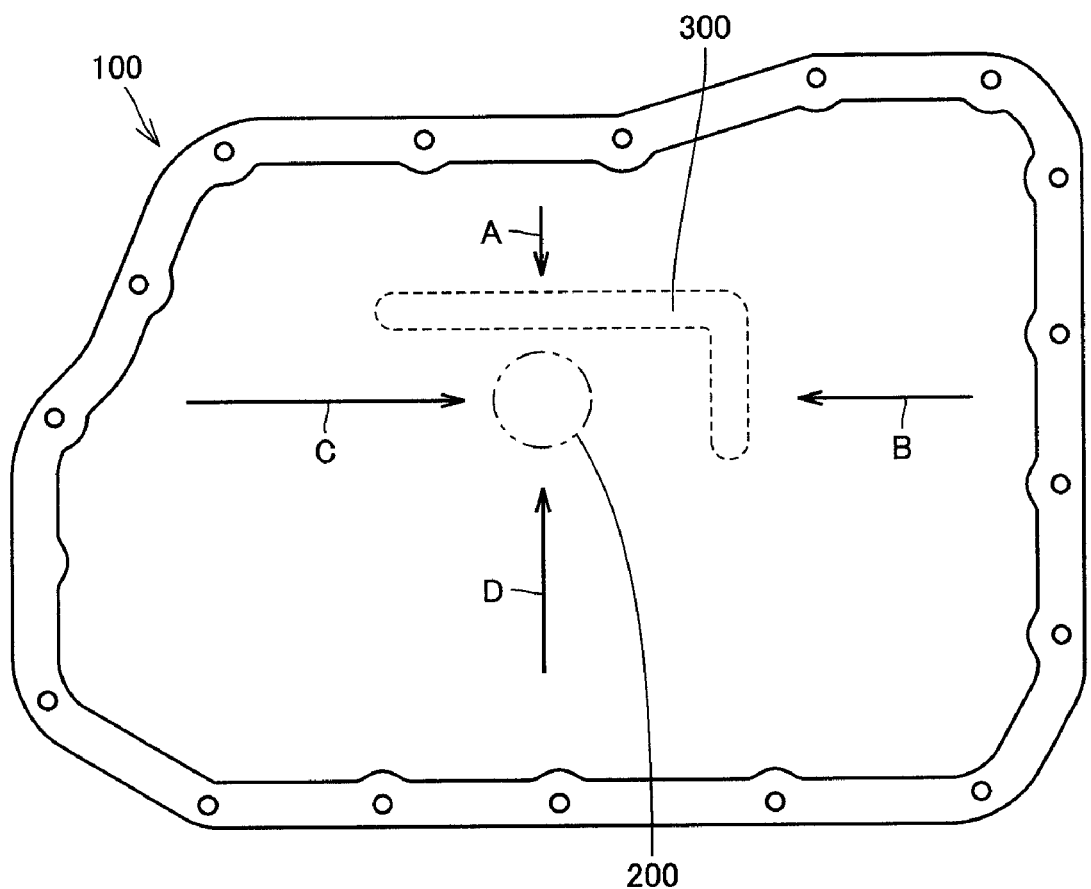
FIG. 2 is a bottom view of an oil pan provided with the oil suction device for the automatic transmission according to one embodiment of the present invention.

FIG. 1 is a bottom view of a case of an automatic transmission provided with an oil suction device for the automatic transmission according to one embodiment of the present invention. FIG. 2 is a bottom view of an oil pan provided with the oil suction device for the automatic transmission. In FIGS. 1 and 2 at an upper side an engine is provided. In FIGS. 1 and 2 at a right side (or a side closer to the front side of the vehicle) an oil cooler is provided. In FIGS. 1 and 2 at a left side (or a side closer to the rear side of the vehicle) a differential mechanism is provided. In FIGS. 1 and 2 at a lower side a rear cover is provided.

With reference to FIGS. 1 and 2, the automatic transmission includes an oil pan 100, a suction port 200 drawing in the oil in oil pan 100, and an elastic wall 300 located adjacent to suction port 200.

Oil pan 100 reserves oil. Oil pan 100 has the oil drawn into suction port 200. The oil drawn into suction port 200 is supplied to various portions of automatic transmission 1 and subsequently flows downward to oil pan 100. The oil thus circulates in the case of automatic transmission 1.

Automatic transmission 1 is mounted on a vehicle. As such, it is exposed to various temperatures as it is used. If automatic transmission 1 is exposed to low temperature such as an extremely low temperature of −20° C. to −30° C., the oil increases in viscosity. This prevents the oil that is supplied to the various portions of automatic transmission 1 from readily returning to oil pan 100 and thus provides a tendency to reduce the liquid level of the oil in oil pan 100.

Automatic transmission 1 at a portion (indicated in FIG. 1 by α) closer to the engine (i.e., the upper side in FIGS. 1 and 2) is provided with an oil path 2 for supplying working oil, lubricant oil and the like from a valve body that is a hydraulic control device to an oil pump, a lockup mechanism, a planetary gear mechanism and other mechanisms. The existence of oil path 2 results in the case having a reduced space. Automatic transmission 1 at the portion closer to the engine thus has a tendency to prevent the oil from readily flowing down to oil pan 100.

Automatic transmission 1 at a portion closer to the front side of the vehicle (i.e., the right side in FIGS. 1 and 2) is provided with a path for oil returned from the oil cooler. At low temperatures, and at narrow throttle, the oil cooler has a reduce oil flow rate, and thus also has a tendency to return a reduced amount of oil. Thus, at low temperatures, and at narrow throttle, automatic transmission 1 at the portion closer to the front side of the vehicle also has a tendency to prevent the oil from readily flowing down to oil pan 100.

In contrast, automatic transmission 1 at a portion closer to the rear side of the vehicle (i.e., the left side in FIGS. 1 and 2) and a portion closer to the rear cover (i.e., the lower side in FIGS. 1 and 2) provides a relatively large space in the case. This ensures that automatic transmission 1 at the portion closer to the rear side of the vehicle and the portion closer to the rear cover returns a larger amount of oil than automatic transmission 1 at the portion closer to the front side of the vehicle and the portion closer to the engine does.

Oil pan 100 thus receives the oil returned thereto in different amounts. As has been previously described, if at low temperature oil pan 100 has oil therein with its liquid level generally reduced, a portion of oil pan 100 that receives a small amount of the oil returned to oil pan 100 may allow air to be disadvantageously drawn into suction port 200. In the FIGS. 1 and 2 example, a flow in directions A and B has a tendency to contain air more readily than that in directions C and D.

Automatic transmissions mounted on vehicles are increasingly reduced in size. This provides a tendency to provide a reduced space between an internal surface of the transmission's case and the items accommodated in the case. This facilitates causing air blown out from a breather at high temperatures. Under such circumstance the case is required to have a reduced amount of oil therein. The reduced amount of oil in the case facilitates reducing the liquid level of the oil in oil pan 100. Accordingly, it is an important issue to reduce air drawn in at low temperatures.

In the present embodiment flows A and B are interrupted by providing elastic wall 300 selectively at a position between suction port 200 and the side closer to the engine (the upper side in FIGS. 1 and 2) and a position between suction port 200 and the side closer to the front side of the vehicle (the right side in FIGS. 1 and 2). This can reduce air contained in flows A and B and drawn into suction port 200.

Figure 3:
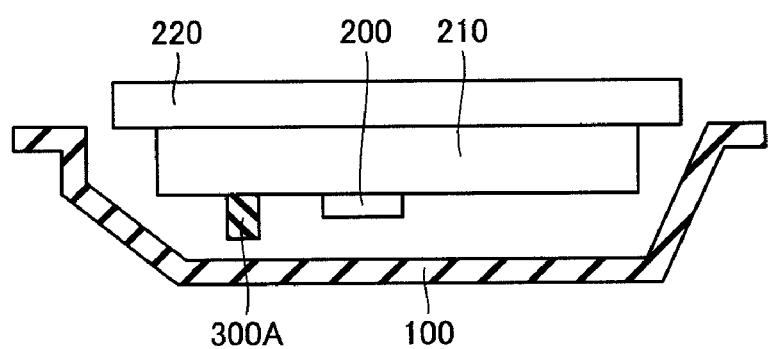
FIG. 3 shows an oil suction device according to a comparative example.

FIG. 3 shows an oil suction device according to a comparative example. In the FIG. 3 example oil pan 100 underlies an oil strainer 210 and a valve body 220. Oil strainer 210 and valve body 220 receive oil drawn into suction port 200 and guided to oil strainer 210 and valve body 220. Furthermore this comparative example replaces elastic wall 300 of the present embodiment with a rib 300A provided between a bottom surface of oil pan 100 and a lower surface of oil strainer 210.

In the FIG. 3 example, as well as the FIGS. 1 and 2 example, rib 300A can be provided selectively only at a position between suction port 200 and the engine and a position between suction port 200 and the front side of the vehicle to provide an increased resistance to a flow path having a direction allowing air to be more readily contained. However, if in this case there remains a gap between rib 300A and oil pan 100 it is still difficult to completely prevent air drawn into suction port 200.

Figure 4:
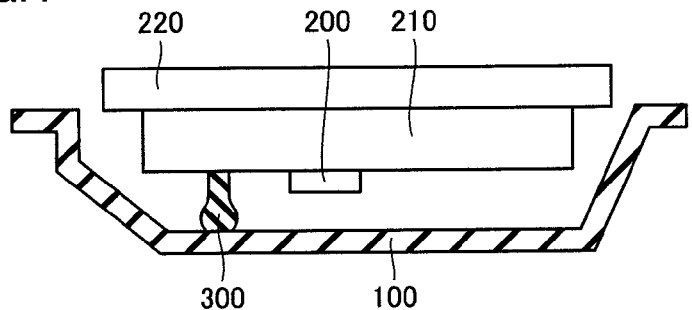
FIG. 4 shows an oil suction device for an automatic transmission according to one embodiment of the present invention.

FIG. 4 shows the oil suction device for the automatic transmission according to the present embodiment. With reference to FIG. 4 the present embodiment allows elastic wall 300 to completely obstruct a gap formed between a bottom surface of oil pan 100 and a lower surface of oil strainer 210. Elastic wall 300 provided to interrupt a flow that readily contains air ensures preventing air drawn into suction port 200.

Elastic wall 300 is configured for example of a material, such as rubber, that is elastically deformable between the bottom surface of oil pan 100 and the lower surface of oil strainer 210. Elastic wall 300 formed of material high in elasticity can absorb a dimensional error of the gap formed between the bottom surface of oil pan 100 and the lower surface of oil strainer 210. Furthermore if a running vehicle hits a stone or the like or the vehicle is running on a bad road or the like and oil pan 100 is accordingly deformed, such elastic wall 300 can reduce damage to oil strainer 210 and valve body 220.

Figure 5:
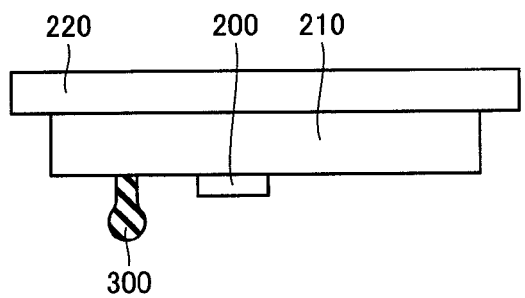
FIGS. 5, 6 and 7 show one, another and still another examples, respectively, of a method of providing an elastic wall included in the oil suction device shown in FIG. 4.
Figure 6:
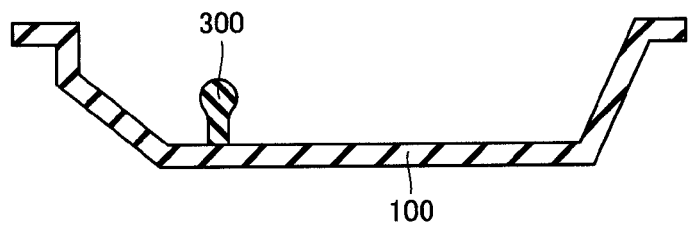
Figure 7:
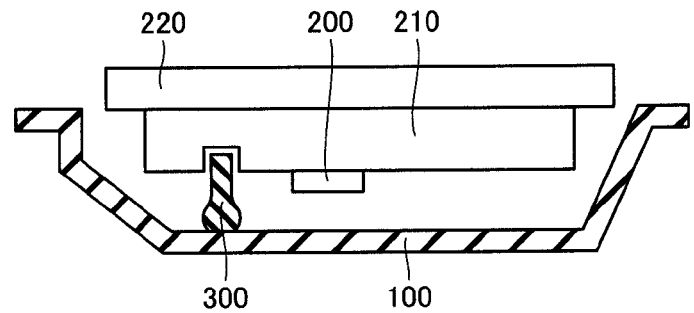

Reference will now be made to FIGS. 5-7 to describe an example of a method of providing elastic wall 300. In the FIG. 5 example, elastic wall 300 is attached to a lower surface of oil strainer 210. Such elastic wall 300 is pressed against a bottom surface of oil pan 100 to obstruct the gap formed between the bottom surface of oil pan 100 and the lower surface of oil strainer 210. In the FIG. 6 example, elastic wall 300 is attached to a bottom surface of oil pan 100 and a lower surface of oil strainer 210 is pressed against elastic wall 300 to obstruct the gap formed between the bottom surface of oil pan 100 and the lower surface of oil strainer 210. In the FIG. 7 example, oil strainer 210 has a lower surface having a guide portion receiving a portion of elastic wall 300 and oil pan 100 and oil strainer 210 have a bottom surface and a lower surface, respectively, sandwiching elastic wall 300 to obstruct the gap formed between the bottom surface of oil pan 100 and the lower surface of oil strainer 210.

As described above, the present embodiment provides an oil suction device for automatic transmission that has elastic wall 300 provided selectively between a portion of oil pan 100 that receives a relatively small amount of the oil returned to oil pan 100 and suction port 200 to effectively reduce air drawn in from the portion of oil pan 100 that receives the relatively small amount of the oil returned to oil pan 100.

Furthermore in the above device elastic wall 300 can deform in accordance with the gap between the bottom surface of oil pan 100 and the lower surface of oil strainer 210 to absorb a dimensional error of a gap formed between oil pan 100 and oil strainer 210. This can more effectively reduce air drawn in from a portion of oil pan 100 that receives a small amount of the oil returned to oil pan 100.

Figure 10:
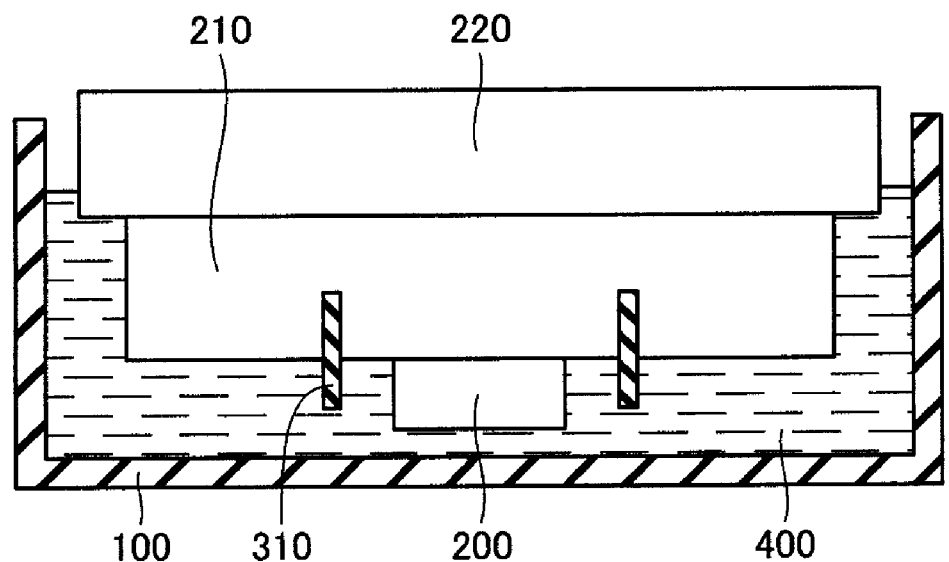
FIG. 10 shows an exemplary variation of the oil suction device for the automatic transmission according to one embodiment of the present invention with oil having a high liquid level.
Figure 11:
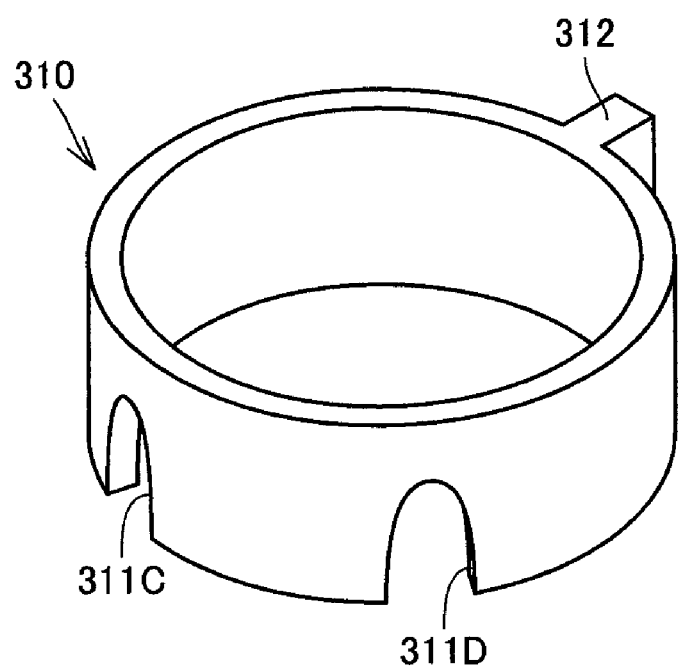
FIG. 11 shows a cylindrical member included in the oil suction device shown in FIGS. 8-10.

Reference will then be made to FIGS. 8-11 to describe an exemplary variation of the oil suction device of the present embodiment. FIG. 8 shows the exemplary variation with oil having a low liquid level. FIG. 9 is a cross section IX-IX of FIG. 8. FIG. 10 shows the exemplary variation with oil having a high liquid level. FIG. 11 shows a cylindrical member included in the oil suction device shown in FIGS. 8-10.

With reference to FIGS. 8-11, the exemplary variation provides an oil suction device replacing the above described elastic wall 300 with a cylindrical member 310. Cylindrical member 310 surrounds suction port 200. Furthermore cylindrical member 310 has openings 311C and 311D. Opening 311C is located between suction port 200 and a side closer to the differential mechanism and receives oil in direction C. Opening 311D is located between suction port 200 and a side closer to the rear cover and receives oil in direction D. Note that cylindrical member 310 has a projection 312, as shown in FIGS. 9 and 11, and accordingly, cylindrical member 310 is prevented from rotating.

Cylindrical member 310 is formed of a material smaller in specific gravity than oil 400. Thus, as shown in FIG. 8, when oil 400 has a low liquid level cylindrical member 310 has it lower end in contact with the bottom surface of oil pan 100, and, shown in FIG. 10, when oil 400 has a high liquid level cylindrical member 310 floats up and thus has its lower end detached from the bottom surface of oil pan 100. Thus when oil 400 has a low liquid level, i.e., when drawing in air in directions A and B is readily caused, only oil flowing toward suction port 200 in directions C and D is accepted, and when oil 400 has a high liquid level, i.e., when drawing in air is less readily caused, oil flowing toward suction port 200 in any directions is accepted. Thus, when oil 400 has a low liquid level, air drawn in can be reduced, and when oil 400 has a high liquid level, the oil can be drawn in efficiently.

Note that in the above example while openings 311C and 311D are substantially equal in size, there are two openings 311C whereas only a single opening 311D is provided. In other words, opening 311C is larger than opening 311D. This allows oil flowing in direction C to be more readily received than that flowing in direction D. This allows oil 400 to be drawn in efficiently from a side returning a largest amount of oil, or a side closer to the rear side of the vehicle (i.e., a side closer to the differential gear mechanism), and can also reduce air drawn in from a side closer to the rear cover that returns oil in a larger amount than a side closer to the engine and the front side of the vehicle do and in a smaller amount than the rear side of the vehicle does.

In the above example opening 311C is larger in number and thus in area in total than opening 311D. If openings 311C and 311D are equal in number (or the former is smaller in number than the latter), each opening 311C can be increased in size to be larger than opening 311D to allow the former to be larger in area in total than the latter.

Thus the above described, present embodiment in the exemplary variation provides an oil suction device for an automatic transmission such that when oil pan 100 has therein oil 400 having a low liquid level, oil 400 flowing toward suction port 200 from a portion of oil pan 100 that receives a relatively small amount of oil 400 returned to oil pan 100 is selectively interrupted by cylindrical member 310, and when oil pan 100 has therein oil 400 having a high liquid level, oil 400 flowing toward suction port 200 in any directions is accepted. Thus, when oil 400 has a low liquid level, air drawn in from a portion of oil pan 100 that receives a small amount of the oil returned to oil pan 100 can be effectively reduced, and when oil 400 has a high liquid level, suction port 200 can draw in oil 400 efficiently.

Furthermore in the above device cylindrical member 310 is configured to float up in accordance with the liquid level of oil 400 reserved in oil pan 100. This allows cylindrical member 310 to interrupt a flow of oil, as switched automatically in response to the liquid level of oil 400.

The above description is summarized as follows: the present embodiment provides an oil suction device for an automatic transmission that in one aspect, as shown in FIGS. 1, 2 and 4, includes: oil pan 100 that receives oil supplied to various portions of the automatic transmission and returned to oil pan 100 and reserves the received oil therein; oil strainer 210 serving as an upper member located over oil pan 100; suction port 200 drawing in the oil reserved in oil pan 100; and elastic wall 300 (an elastic member) that serves as a barrier provided selectively between a portion of oil pan 100 that receives a relatively small amount of the oil returned to oil pan 100 and suction port 200, and extends from a bottom surface of oil pan 100 and reaches a lower surface of oil strainer 210 to interrupt a flow of oil. Elastic wall 300 is deformable in accordance with a gap formed between the bottom surface of oil pan 100 and the lower surface of oil strainer 210.

Note that cylindrical member 310 shown in FIGS. 8-11 with oil pan 100 having therein oil 400 having a low liquid level selectively interrupts oil flowing in directions A and B. As such, as well as elastic wall 300, cylindrical member 310 also similarly configures the barrier.

The present embodiment provides an oil suction device for an automatic transmission that in another aspect as shown in FIGS. 8-11 includes: oil pan 100; oil strainer 210; suction port 200; and cylindrical member 310 serving as a wall member surrounding suction port 200 and having openings 311A and 311B between a portion of oil pan 100 that receives a relatively large amount of the oil returned to oil pan 100 and suction port 200. Cylindrical member 310 is movable upward and downward relative to suction port 200 in response to the liquid level of oil 400 reserved in oil pan 100. When cylindrical member 310 moves to its lowest position it has its lower end in contact with a bottom surface of oil pan 100. When cylindrical member 310 moves to a position upper than the lowest position it has its lower end detached from the bottom surface of oil pan 100.

Note that the wall member is not limited to cylindrical member 310. It may for example be a polygonal tubular member. Such polygonal tubular member can prevent its rotation without projection 312 as provided to cylindrical member 310. Furthermore, the wall member is not limited to a tubular member. For example it may be a member in the form of a flat plate provided selectively between a portion of oil pan 100 that receives a small amount of the oil returned to oil pan 100 and suction port 200.

Note that a portion of oil pan 100 that receives a relatively large amount of oil 400 returned to oil pan 100 includes a first portion located closer to the rear cover and a second portion located closer to the differential mechanism and receiving oil 400 returning in a larger amount than the first portion closer to the rear cover does, and the opening includes opening 311D serving as a first opening located closer to the rear cover and opening 311C serving as a second opening located closer to the differential mechanism. Opening 311C is formed to be larger than opening 311D.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An oil suction device for an automatic transmission, comprising:
   an oil pan having a bottom surface, and receiving and reserving therein oil supplied to various portions of the automatic transmission and returned to said oil pan;
   an upper member having a lower surface over said oil pan, wherein said upper member comprises an oil strainer;
   a suction port drawing in the oil reserved in said oil pan; and
   an elastic barrier provided selectively between a portion of said oil pan that receives a relatively small amount of the oil returned to said oil pan and said suction port, said barrier extending from said bottom surface of said oil pan and reaching said lower surface of said upper member to interrupt a flow of the oil, wherein said barrier is made from a non-porous material.

2. The oil suction device for an automatic transmission according to claim 1, wherein said barrier is deformable in accordance with a gap formed between said bottom surface of said oil pan and said lower surface of said upper member.

* * * * *